United States Patent [19]

Judd et al.

[11] Patent Number: 5,465,251
[45] Date of Patent: Nov. 7, 1995

[54] NETWORK ADDRESSING

[75] Inventors: Ian D. Judd, Winchester; Reginald Beer, Chandlers Ford, both of England

[73] Assignee: International Business Machines Corporation, Armonk, N.Y.

[21] Appl. No.: 74,243

[22] Filed: Jun. 9, 1993

[30] Foreign Application Priority Data

Jun. 23, 1992 [GB] United Kingdom ............... 9213240.6

[51] Int. Cl.⁶ ........................... H04L 12/56; H04Q 11/00
[52] U.S. Cl. ............................ 370/54; 370/60; 370/94.1; 340/825.03; 340/825.52; 340/825.54
[58] Field of Search .................... 370/54, 56, 60, 370/60.1, 85.1, 85.15, 85.7, 94.1, 94.2, 94.3, 95.1, 92; 340/825.02, 825.52, 825.53, 825.54; 364/242.94, 242.95, 242.96; 395/200

[56] References Cited

U.S. PATENT DOCUMENTS

| | | | |
|---|---|---|---|
| 4,825,206 | 4/1989 | Brice, Jr. et al. | 340/825.02 |
| 4,951,278 | 8/1990 | Biber et al. | 370/94.1 |
| 5,077,554 | 12/1991 | Orita et al. | 340/825.02 |
| 5,105,424 | 4/1992 | Flaig et al. | 370/94.1 |
| 5,243,592 | 9/1993 | Perlman et al. | 370/94.3 |

Primary Examiner—Hassan Kizou
Attorney, Agent, or Firm—Ingrid M. Foerster; Joseph F. Villella, Jr.

[57] ABSTRACT

Described is a network addressing scheme in which a message sent from a source node to a destination node includes a path address which defines the path over which the message should travel to reach the destination node. At each node along the path between the source and destination, the path address is compared against a predetermined value, and on determining that the address and predetermined value are different, the node modifies the address before forwarding the message onto the next node. In a switch node having three or more ports, the identity of the output port is determined from the path address and a portion of the address is deleted before sending the message out on that output port. Also described is a method of configuring a network in which one or more initiator nodes are defined, the initiator nodes issuing query messages to an adjacent node which responds by sending the initiator details of the number of operational ports which are implemented in the adjacent node. The initiator node then issues query messages addressed to those nodes which are attached to the operational ports on the adjacent node. This continues until the initiator has walked through the entire network at which point the configuration process is complete.

10 Claims, 6 Drawing Sheets

FORMAT 1:

| BYTE | |
|---|---|
| 0 | MESSAGE_CODE=00h |
| 1 | PAD    00h |
| 2 | TAG |
| 3 | |
| 4 | RETURN_ADDRESS |
| . | |
| 7 | |
| 8 | UNIQUE_ID |
| . | |
| 15 | |

FIG. 9A

FORMAT 2:

| BYTE | |
|---|---|
| 0 | MESSAGE_CODE=00h |
| 1 | TAG |
| 2 | |
| 3 | RETURN_ADDRESS |
| . | |
| 6 | |
| 7 | UNIQUE_ID |
| . | |
| 14 | |

FIG. 9B

| BYTE | | |
|---|---|---|
| 0 | MESSAGE_CODE=01h | |
| 1 | CURRENT_PORT | TOTAL_PORTS |
| 2 | TAG | |
| 3 | | |
| 4 | PORT_MASK | |
| 5 | | |
| 6 | UPPER_LEVEL_PROTOCOL (ULP) | |
| 7 | 0 0 0 0 0 0 0 | INIT |
| 8 | UNIQUE_ID | |
| . | | |
| 15 | | |

FIG. 10

NETWORK ADDRESSING

FIELD OF THE INVENTION

This invention relates to network addressing and more particularly to a method of and apparatus for routing a message in a network of interconnected nodes.

BACKGROUND OF THE INVENTION

A variety of different types of network configurations have been proposed or used for transmitting data between interconnected nodes in a network. For example, Local Area Networks (LANs) comprise a number of computer based pieces of equipment which are normally distributed within a single establishment. A LAN is most commonly arranged into one of three basic topologies, namely star, bus and ring. More complex network configurations are possible by interconnecting a number of different LANs by means of switches in the form of bridges or routers.

There are a number of different protocols which define the method by which data and commands in the form of messages are transferred from one node to another in a network. In most network protocols, the usual method of routing messages between nodes is to include header information as part of the message which header specifies the address of the destination node and often the address of the node from which the message originates (source address). The addresses specified in the header are those unique addresses which have been assigned to the nodes when the network is configured. In some network schemes, it is necessary to assign a value to a particular node by means of a switch. In a network comprising a number of ring networks interconnected via some form of switch, the address information will commonly have two components identifying the target network and the destination node within the target network.

When a message is sent through a network from a source node to a destination, each node receiving the message processes the destination address information to determine whether the address matches the unique address assigned to that node at power-on. If there is no match, the node forwards the message onto the next (downstream) node which then processes the address information in the same way. In a ring configuration, all the component nodes are generally dual-ported and there is thus no requirement on the nodes to determine on which output path the message should be forwarded. However, in other topologies, in which the component nodes may be single-ported, dual-ported or switch nodes comprising three or more ports, the switch node will contain routing hardware which must determine the identity of the output port for any particular message. In some routing schemes, the switch compares the destination address in the message with a list of addresses contained in a table in order to determine the output node.

There are a number of disadvantages inherent in previously used routing methods. For example, the routing hardware required at each node to store its unique address, to extract the destination address from the incoming message, and to compare the extracted address with the unique node address is necessarily complex. In a switch node, the hardware is even more complex to enable parsing of the incoming message for the unique identity of the output port from which the message is to be further transmitted. Previously used methods also require the assignment of the unique node addresses at power on, which is sometimes accomplished by the inconvenient means of manual switches.

SUMMARY OF THE INVENTION

The present invention improves upon prior addressing schemes and accordingly provides a method of rolling a message from a source node to a destination node in a network having a plurality of interconnected nodes. A source node issues a message including a path address value specifying the route through the network which the message is to take to the destination node. The message is then received by a first node connected to the source node. The receiving node determines whether a predetermined portion of the path address value corresponds to a predetermined value and if so accepts the message. Otherwise, the node modifies the path address value and then transfers the message including the modified path address value onto the next node. The steps of receiving, determining and transferring are then repeated at each subsequent node until the route address value corresponds to a predetermined value at which point the message has reached the destination node.

Thus a routing method is facilitated, whereby the route address employed in a message allows each node to make a simple routing decision by inspecting a portion of the path address and comparing the portion with a predetermined value. In a preferred routing method, the predetermined value is a zero for all nodes in the network. In this way, the routing hardware in each node is kept very simple.

The type of network in which the method of the present invention is particularly advantageous will comprise a mixture of single and dual port nodes which may be arranged in strings, loops or stars, and a number of switch nodes employed to provide an interconnection between the various string or loop portions of the network.

In a preferred method, a dual-ported node on determining that the path address does not correspond to the predetermined value, decrements the portion of the path address before passing the message on to the downstream node. If the next node is also dual-ported then it will process the path address in the same way. The destination node is the node which receives a message including a path address having a zero value. Thus strings or loops of interconnected dual-port nodes are effectively addressed by decrementing a 'hop count.' This method is simple, efficient, and eliminates the possibility for a message frame to circulate on a loop indefinitely.

In a preferred method, when a message enters a switch node through one of its three or more ports, the path address component of the message is analyzed to determine if that node is the destination node. If not, the switch node determines, from a predetermined portion of the path address, the identity of the output node via which the message is to be forwarded onto the next node. The path address is modified before forwarding by deleting the predetermined portion of the path address. The next node then processes the message including the modified path address.

A further advantage of the routing method of the present invention arises from the modular nature of the path address. Small networks can often be addressed by using a single digit path address. However the path address can also be expanded to support very large switched networks with thousands of nodes.

In a preferred routing method, the path address forms part of a message address field which also includes a channel address. The path specifies the route to the destination node and the channel selects a receiving process within the destination node. One channel address is advantageously predefined to receive messages and all other channels are dynamically assigned to inbound data transfers by the destination node. The channel address is modular such that a single 4-bit digit allows up to 15 concurrent inbound transfers. However the address can be expanded to allow thousands of concurrent inbound transfers for each node.

A second aspect of the invention is a method of configuring a network having a plurality of interconnected nodes. One or more initiator nodes are defined within the network. A query message including a path address is then sent from each initiator node to an adjacent node over the path specified by the path address. On receipt of the message, the adjacent node responds with a reply message specifying the number of ports implemented by the adjacent node. The initiator node next sends a configuration message to each node connected to a port implemented on the adjacent node over a path specified in the query message path address. Each path address of each node connected to the initiator node is stored with the associated number of ports implemented by that node in a configuration table within the initiator node.

Using this configuration technique, the initiator 'walks' through the network one link at a time. Each node addressed by a query message from the initiator sends a reply message including the number of operational ports implemented by the addressed nodes. The initiator then send a query message to each of the nodes attached to an operational port on the first node. This process continues until the initiator has walked through the entire network. The configuration technique according to the invention is thus able to configure a network without setting address switches manually, as is the case with the presently used SCSI bus.

In a preferred configuration technique, the initiator should be able to readily detect when it has walked back to a node previously visited (which will happen in a cyclic network). This is achieved by assigning a Unique ID to each switch node in the network. When a switch node is addressed by a query message, it returns the Unique ID as well as the number of operational ports in the reply message. The initiator stores the Unique ID value with the corresponding path address and when the same switch node responds to a later query message, the initiator compares the Unique ID with those already contained in the table and is thus able to determine that it has walked around a cyclic network. In a preferred configuration method, each initiator is also assigned a Unique ID.

BRIEF DESCRIPTION OF THE DRAWINGS

Embodiments of the invention will now be described, by way of example only, with reference to the accompanying drawings in which:

FIGS. 9A and 9B show the two formats of the query_node message employed in the network configuration process;

FIG. 10 shows the format of the Query_node_reply message employed in the network configuration process;

DESCRIPTION OF THE PREFERRED EMBODIMENT

This description utilizes a number of conventions described hereinafter. The bits in an uncoded data byte are numbered 7 to 0 from left to right and Bit 7 is the most-significant bit. The most-significant byte of an integer is first. Bit values are represented as, e.g. 1b and hexadecimal values are represented as, for example, A2h.

The addressing scheme employed in the present invention distinguishes three types of nodes, according to the connectivity. These are a single-port node, a dual-port node and a switch (having 3 to 16 ports). In a network employing the present invention, these nodes will typically be electronic devices such as computers, printers, storage devices, etc.

Figure 1:
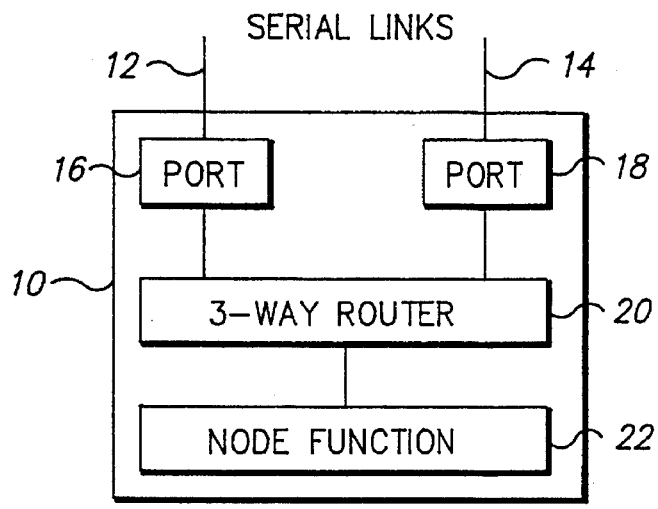
FIG. 1 depicts the major functional components of a dual-ported node such as may be found in a network using the technique of the present invention.

FIG. 1 shows dual-port node 10 including two ports 16, 18 each connected to a serial link 12, 14. Also included is a 3 way router 20 which connects the ports to the node function 22. Depending on the address field, the router forwards an inbound frame to the node itself or to the outbound line of another port. When the node wants to originate a frame it instructs the router to transmit it on a specified port. (All message and data frames relating to a particular command use the same port.)

Figure 13:
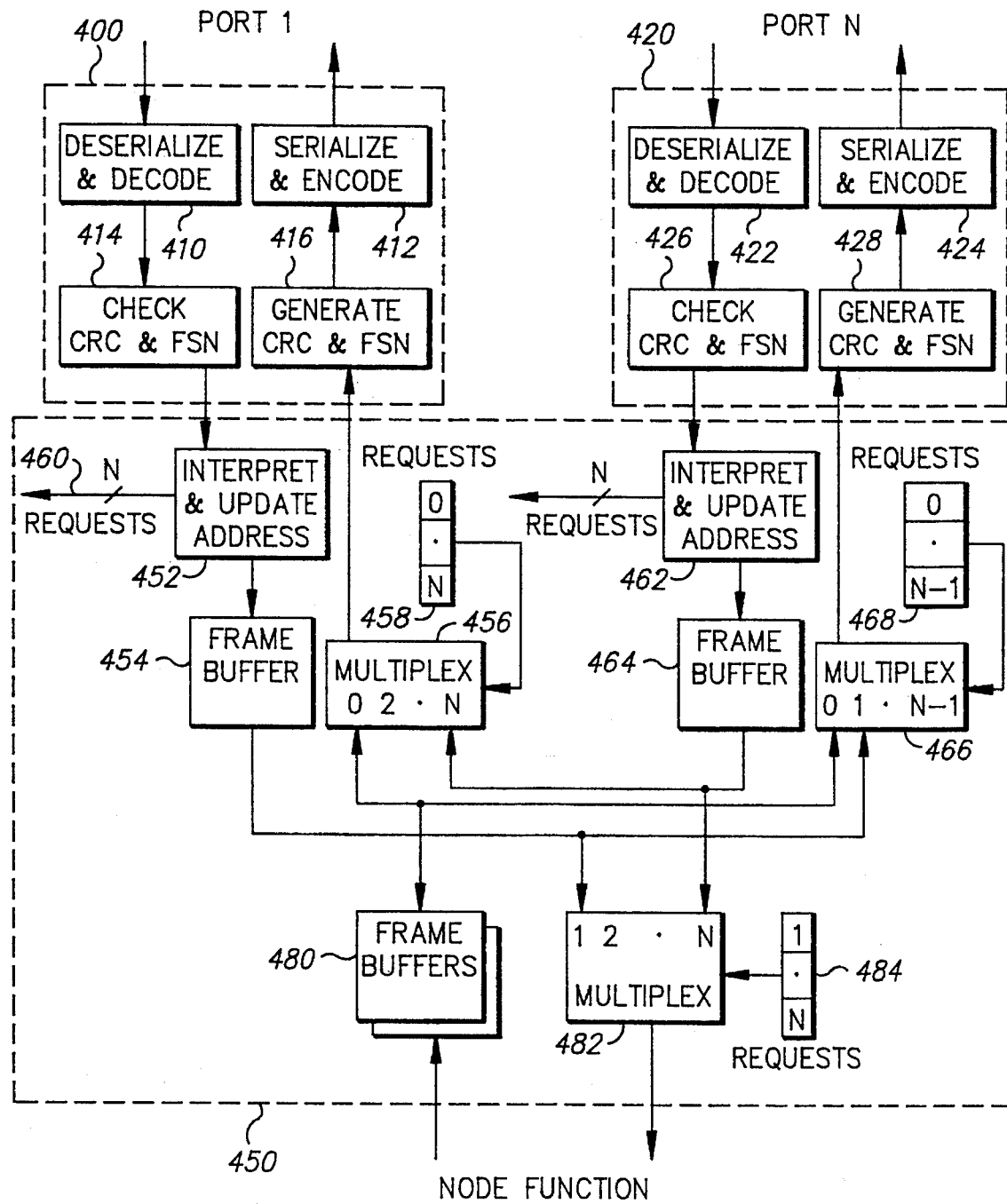
FIG. 13 shows the major functional components of an N-port node.

FIG. 13 shows more detail of the major functional components of an N-port node. Each port includes port logic 400 and 420 including inbound and outbound portions of the serial link. In port 1, the inbound side includes deserializer and decoder logic 410 which converts the data received over the inbound serial link from bit-serial to parallel data (e.g. 1 byte wide). The deserializer may also perform clock recovery, bit synchronization and byte synchronization. None of these functions are essential to an understanding of the present invention and will not be described further. The incoming data may also need to be decoded e.g. a byte may be represented as a 10 bit character on the link. Logic 410 is connected to Check CRC & FSN logic 414 which checks the CRC information contained with the incoming data and also checks that the Frame Sequence Number (FSN) of the incoming frame corresponds to the expected value. In this way the node is able to check that incoming frames of data are being received in the correct sequence. On the outbound side, Generate CRC & FSN logic 416 and Serialize and encode logic 412, have functions which are the corollary of the functions of logic 410 and 414 on the inbound side. Port N includes corresponding logic 422, 424, 426 and 428.

Connected to port logic 400 and 420 is router logic 450 which has the function of routing frames of data arriving in the node via one port to either a different port or to a destination process within the node. Included in router logic 450 is Logic 452 which interprets the address field in each frame and updates it according to the rules for 1-port, 2-port or switch nodes as will be described below. This logic generates N request signals, each of which is sent over line 460 to set a latch in a bank of request latches in one of the other ports (e.g. 468 in port N) to request that port to forward the frame. Frame buffer 454 is connected to Interpret & update address logic 452 and is used to temporarily hold a frame. The buffer stores a count of the total number of bytes in the frame, the control field, the updated address field and the data field. A description of the format of a frame including these various fields will be described below. Only a single frame buffer is shown in FIG. 13. In practice a port will usually have two or more frame buffers to sustain continuous data transfer. This allows one buffer to be filled from the link while another is being forwarded. Also included in router logic 450 is a multiplexer 456 and a bank of request latches 458. In operation, multiplexer 456 selects a frame which is to be forwarded from the frame buffer of another port e.g. buffer 464 of port N through port 1. The bank of request latches 458 indicates to the multiplexer which frame buffers in other ports contain a frame that is awaiting transmission from port 1. If more than one latch is set simultaneously then a rotating priority algorithm can be used to select a particular request for service.

Router logic 450 contains logic components for each port N corresponding to those described for port 1. Logic 462 interprets the address field of a frame and if necessary updates the address. Frame buffer 464 provides temporary storage for a frame. Multiplexer 466 and Request latches 468 control the forwarding of frames over port N. Also included in the router logic are frame buffers 480, multiplexer 482 and request latches 484. These logic components are employed to transfer data which is addressed to this node onto the node function e.g. a destination process within the node. For example this may be a process in a printer which will cause the data to be printed or a process within a disk file which will cause the incoming data to be written to disk. In operation, for a frame received over port 1 which is destined for a process within the node, Interpret and update address logic will generate a request signal which will set a latch in the bank of request latches 484. The set latch informs multiplexer 482 that a frame held in buffer 454 is to be forwarded to the destination process within the node. The frame will the be transferred from buffer 454 to buffer 480.

Turning now to a description of networks in which such a node may be employed, the following are examples of the type of network that can be implemented:

(i) Dedicated Connection

Figure 2:
FIG. 2 shows a network comprising a pair of interconnected single-ported nodes.

FIG. 2 shows the simplest case of a dedicated connection between 2 single-port nodes 30 & 32.

(ii) Strings

Figure 3:
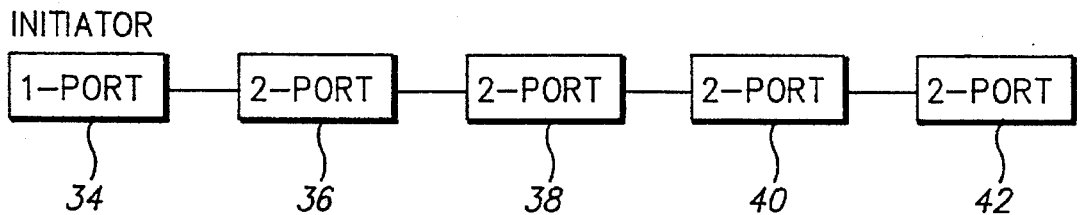
FIG. 3 shows a network configuration comprising a string of interconnected single port and dual port nodes.

FIG. 3 shows a linear network of dual-port nodes 36, 38, 40 and 42 known as a string. The extreme nodes at either end of a string can be single-port nodes 34, dual-port nodes with one disconnected port or switch nodes.

(iii) Loops

Figure 4:
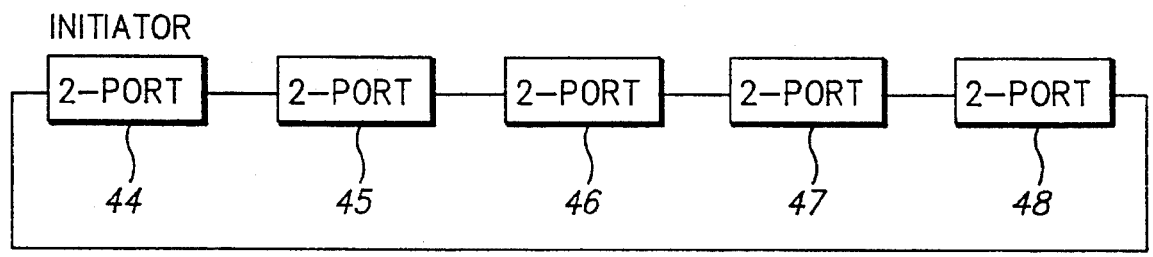
FIG. 4 shows a network comprising a number of dual-ported nodes interconnected in a loop configuration.

A loop is a cyclic network containing only dual-port nodes 44, 45, 46, 47 and 48 as shown in FIG. 4. A loop provides better availability than a string because any single node can fail without blocking communication between any pair of the remaining nodes. A node can also be inserted into the loop or removed from the loop dynamically without preventing communication between the other nodes.

(iv) Switches

Figure 5:
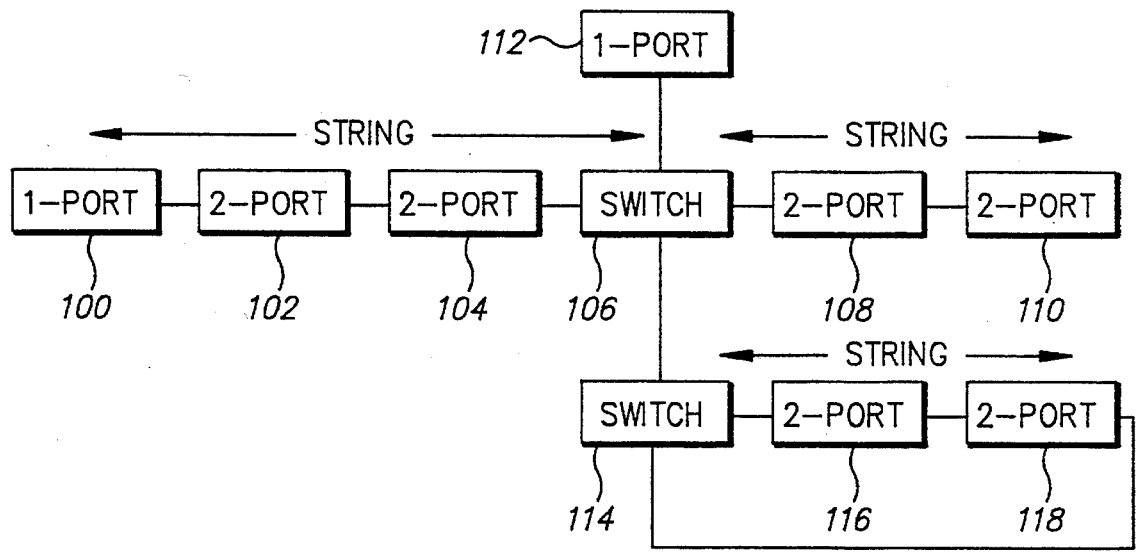
FIG. 5 shows a example network of interconnected nodes, including single port, dual port and switch nodes.

FIG. 5 shows a complex network including two switches 106 and 114, three strings 100,102 and 104; 108 and 110; and 116 and 118, and a cyclic path linking node 118 to switch 114. Switches permit the inter-connection of a large number of nodes. They also allow alternate paths to be provided to achieve fault tolerance.

Figure 6A:
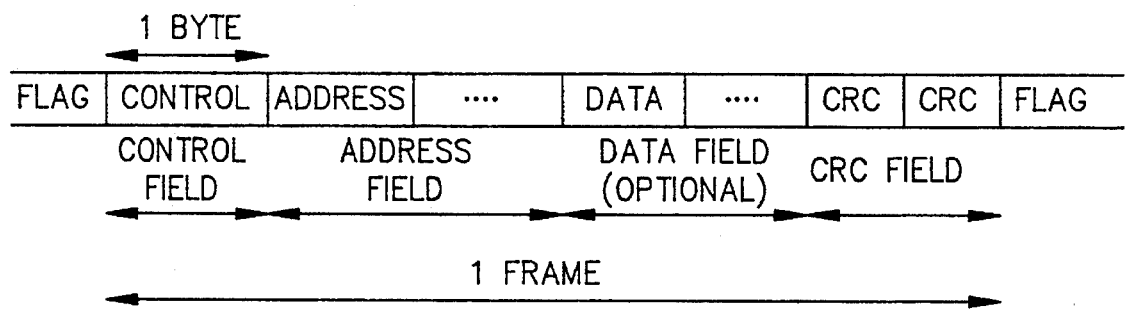
FIG. 6A shows the format of a frame used in communication between nodes.

The two ports at opposite ends of a serial link communicate in units called frames. A frame consists of a sequence of at least 4 data bytes delimited at each end by a special protocol character known as a FLAG. A frame is divided into a sequence of 3 or 4 fields as shown in FIG. 6A.

The control field consists of 1 byte, and is always present. This field indicates the frame type and the sequence number. For addressing scheme 'B' it also includes a Digit_delete flag, as described later.

The address field is from 1 to 6 bytes in length, and is always present. This field is used to route the frame, as described below.

The data field consists of up to 128 bytes, and is an optional field. Except for the configuration messages described later, the contents of the data field are not relevant to an understanding of the present invention.

The CRC field consists of 2 bytes, and is always present. This field is a standard Cyclic Redundancy Check of the control, address and data fields. It will not be described further.

The maximum lengths of the address and data fields are chosen as a balance between network size, communication efficiency and implementation cost.

The address field of a frame is used firstly to route the frame over a selected path to the destination node. Path addresses are geographic relative to the source node. This simplifies the routing hardware and it avoids the need to assign absolute node addresses at power-on.

The second function of the address field is to select a channel within the destination node. A channel consists of the facilities to receive a message or to receive a single data transfer. Every node must provide a channel to receive messages. Most nodes also provide at least one channel to receive data. They may implement additional channels to support any number of concurrent inbound data transfers. In practice a device may support only 1 data channel but an adapter or controller will typically provide several.

The upper-level protocol initiates data transfers by exchanging message frames between the source node and the destination node. The destination node allocates a channel to receive the data frames and it indicates the number of bytes that it can currently accept.

Figure 6B:
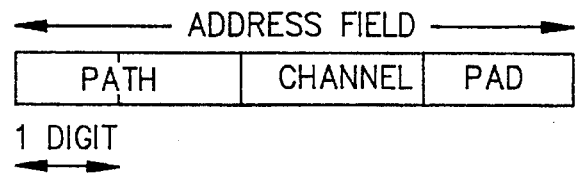
FIG. 6B shows the format of the address field component of FIG. 6A.

Accordingly the frame address field contains from 1 to 6 bytes, depending on the complexity of the network and the number of channels implemented by the destination node. The address field begins in the first byte following the control field. It consists of 2 or 3 components and each component is divided into one or more 4-bit digits, as shown in FIG. 6B.

The path component routes the frame to the destination node. Each digit corresponds to a string or a switch in the path from the source node to the destination node. When a frame is forwarded by a dual-port node the first digit of the path is decremented. When a frame passes through a switch the first 1 or 2 digits of the path are deleted. This exposes the remainder of the address for subsequent routing decisions. This process is described in much greater detail below.

The channel component directs the frame within the destination node. The interpretation depends on the addressing scheme used ('A' or 'B'), as described later. One channel is predefined to receive messages and the rest are available for inbound data transfers. Typically the data channels will be dynamically allocated by the upper-level protocol.

If necessary, a single digit pad is provided to make the address field up to an integral number of bytes. The value of the padding digit is normally unimportant since the destination node will have allocated the channel and it therefore knows how many digits are needed to address it.

Each type of node uses different rules to interpret the address field of an inbound frame, as described in the following sections. Two different schemes (A & B) are described which are functionally equivalent. Scheme 'A' is somewhat simpler to implement in hardware, whereas scheme 'B' tends to have a more compact address field. Both schemes are implemented using logic such as has been described with reference to FIG. 13.

SCHEME A

In this scheme each switch deletes the first byte of the path address when it forwards a frame.

The channel addressed by the single digit 0h is predefined for all nodes to receive messages. All other channels are available for data transfer. Thus a single-digit channel address allows up to 15 data channels, 2 digits allow up to 240 data channels, and so on.

In all cases below 'Hi_digit' refers to bits 7:4 of the first byte in the address field and 'Lo-digit' refers to bits 3.0.

The different types of node listed above interpret the address field in a different way. As has been described, interpret and update address logic 452 or 462 in FIG. 13 carries out this process.

Single-Port Node: A single-port node interprets the address field in the following manner:

```
If Hi_digit = 0h then Do;
    Accept the frame;
    Interpret the remainder of the address field as a
        channel;
End;
Else reject the frame;
```

The port in a single port node is numbered '0' for reference by the Query_node_reply message, details of which are described below.

Dual-Port Node: A dual-port node interprets the address field as follows:

```
If Hi_digit = 0h then Do;
    Accept the frame;
    Interpret the remainder of the address field as a
        channel;
End;
Else Do;
    Decrement Hi_digit;
    Forward the frame on the other port;
End;
```

Dual-port nodes treat the first digit of the address field as a 'hop count' of the nodes to be traversed. The destination node in a string or loop is located by decrementing the hop count until it reaches zero. Using scheme A, in order to allow unrestricted communication between any two nodes the maximum number of nodes which may be formed in a string is 17, including the end nodes. This is due to the use of a single Hex digit to address all nodes in the string. For example, this allows 16 devices to be connected to a single adapter port.

The two ports of a dual port node are numbered '0' and '1' for reference by the Query_node_reply message, details of which are described below.

Switch Node: A switch node interprets the address field as follows:

```
If Hi_digit = 0h then Do;
    If Lo_digit = 0h then Do;
        Accept the frame;
        Interpret the remainder of the address field as a
            channel;
    Else Do;
        Select Output_Port = (Input_port + Lo_digit)
            Modulo 16;
        Delete the first address byte;
        Forward the frame via Output_port;
    End;
End;
Else reject the frame;
```

The switch ports are numbered sequentially by the implementation, starting from '0'. (Note that the port numbers are fixed, but frame addressing is relative to the input port.) In practice all initiators must execute the configuration process to discover the nodes that are operational and their path addresses. It is not possible to have a switch forward a frame out of the same port that received it.

An example of a network employing scheme A will now be described with reference to FIG. 7 which shows a network topology corresponding to that shown in FIG. 5. The numbers in the edges of the boxes are the (assumed) port numbers. For illustration purposes only, the ports are numbered clockwise from the port nearest the indicated 'initiator'. The number inside each box is the hexadecimal path address of that node relative to that initiator. The dual-port nodes on the cyclic path 216, 218 have two addresses depending on the path used by the initiator.

Taking as an example the routing of a message from initiator node 200 to dual-port node 210, the path address specified in the address field will comprise 221h. Node 202 on receiving the message determines in accordance with the above defined dual-port algorithm that Hi_digit is not equal to 0h and accordingly decrements Hi_digit from 2h to 1h. Similarly, dual port node 204 decrements Hi_digit 1h to 0h and forwards the message on to switch 206. The switch examines both Hi_digit (0h) and Lo_digit (2h), determines that Hi and Lo are not both equal to 0h and then in accordance with the Switch algorithm defined above determines on which of its ports the message should be forwarded. The input port is numbered 0 and thus (Input_port+ Lo_digit) Modulo 16 is determined to be equal to 2. Before forwarding the message from port 2, the switch deletes the first address byte to leave a path address of 1h. Node 208 examines the address and decrements the path address value to 0h. Node 210 in turn processes the path address, determines that it is the destination node and accordingly accepts the message.

SCHEME B

In this scheme each switch deletes the first 1 or 2 digits of the path address. This is accomplished by defining a Digit_delete flag in the frame control field. The first digit is logically deleted by setting Digit_delete. The second digit is deleted by clearing Digit_delete and physically deleting the first byte of the address field. The third digit is then logically deleted by setting Digit_delete, and so on.

All channels beginning with the digit 0h are invalid. The channel addressed by the single digit 1h is predefined for all nodes to receive messages. All other channels are available for data transfer. Thus a single-digit channel address allows up to 14 data channels. 2 digits allow up to 224 data channels, and so on. In all cases below 'Next_digit' refers to the next active digit in the current address field, after taking account of Digit_delete in the control field and digits that have been deleted by previous rules.

Single-Port Node: A single-port node interprets the address field as follows:

```
Accept the frame;
If Next_digit = 0h then delete Next_digit;
If (new) Next_digit = 0h then delete Next_digit;
Interpret the remainder of the address field as a channel;
```

One leading zero needs to be discarded when a single-port node is at the end of a string. Two leading zero's need to be discarded when a single-port node receives a Query_node message during the configuration process.

Dual-Port Node: A dual-port node interprets the address field as follows:

```
If Next_digit = 0h then Do;
    Accept the frame;
    Discard Next_digit;
    If (new) Next_digit = 0h then discard Next_digit;
    Interpret the remainder of the address field as a
        channel;
End;
Else Do;
    Decrement Next_digit;
    Forward the frame on the other port;
End;
```

One zero needs to be deleted before the channel address when a dual-port node receives a Query_node message during the configuration process.

Switch Node: A switch node interprets the address field as follows:

```
If Next_digit = 0h then discard Next_digit;
If (new) Next_digit = 0h then Do;
    Accept the frame;
    Delete Next_digit;
    Interpret the remainder of the address field as a
        channel;
End;
Else Do;
    Select Output_port = (Input_port + (new) Next_digit)
        Modulo 16;
    Delete (new) Next_digit;
    Forward the frame via the selected port;
End;
```

One leading zero needs to be deleted when a switch is at the end of a string.

Figure 8:
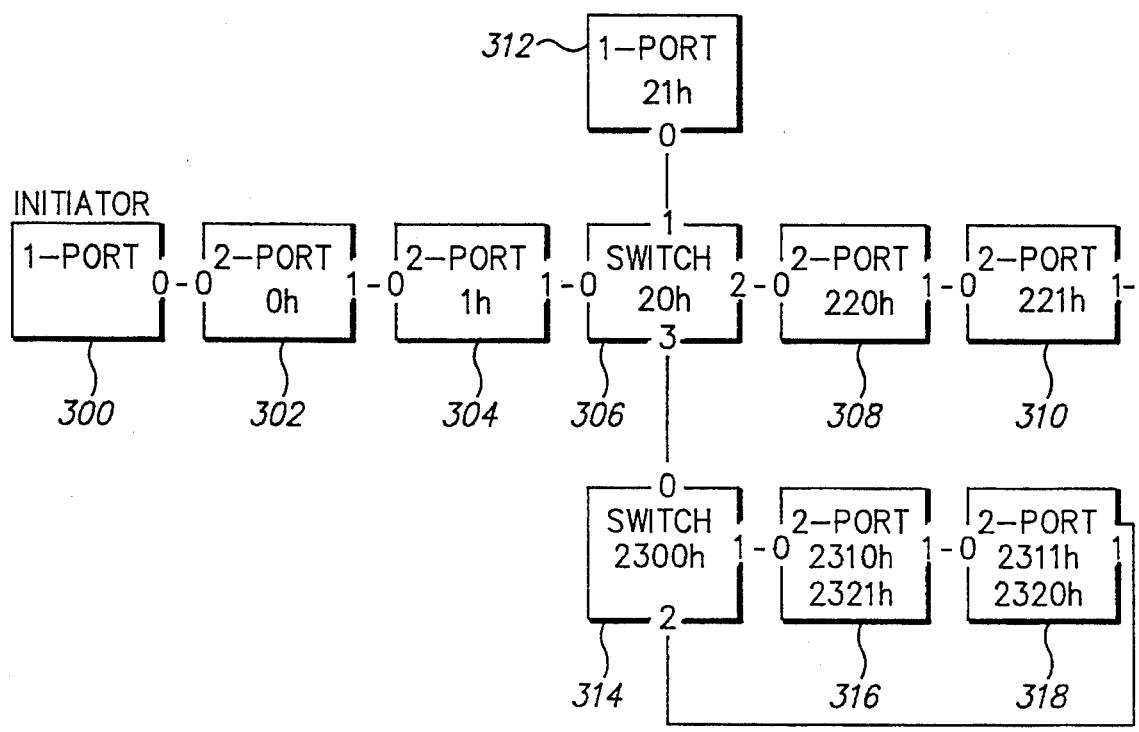
FIG. 8 shows a network employing an alternative embodiment (Scheme B) of the addressing scheme of the present invention.

An example of a network employing addressing scheme B will now be described with reference to FIG. 8. Taking the routing of a message from node 300 to 310 as an example, the path address in the message frame address field will be 221h. Node 302 decrements Next_digit to 1h and forwards the message including a path address of 121h onto node 304. At node 304, Next_digit is decremented to 0h and the message including a path address of 021 on to switch node 306. Node 306 discards Next_digit and calculates the output port as port 2. The (new) Next_digit is discarded and the message including a path address of 1h is forwarded to node 308, which in turn decrements Next_digit to 0h. Node 310 on receipt of the message determines that it is the destination node, accepts the message and determines the channel address within the node to which the message is directed.

Figure 7:
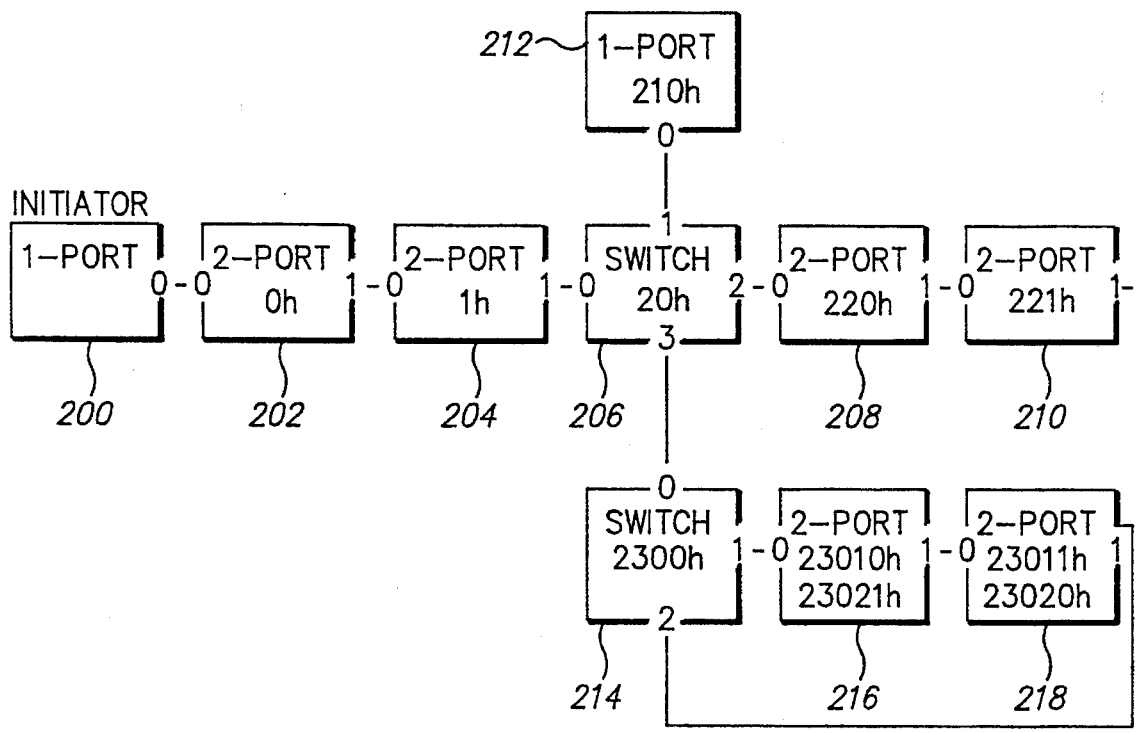
FIG. 7 shows a network employing one embodiment (Scheme A) of the addressing scheme of the present invention.

It will be noted that with scheme B nodes 314, 316 and 318 are addressable using a 4-digit path address in contrast to the 5-digit path address of the corresponding nodes 214, 216 and 218 in FIG. 7. Thus it will usually be the case that a smaller number of digits will be necessary to address nodes in a network employing scheme B.

Next will be described the technique employed for configuring the network. For each command sent over the network, a node can be classified as either (i) an initiator, i.e. the node that issued the command, or (ii) a Target, i.e. the node that received the command.

Each potential initiator must perform a configuration process to determine the other nodes that are present in the network and their path address(es). The transport layer defines the Query_node and Query_node_reply to support configuration. The upper-level protocol is expected to define commands to retrieve Vital Product Data such as the device type and serial number. For example, SCSI provides the Inquiry command, All switches and initiators must be assigned a Unique_ID when the node is manufactured. The Unique_ID is typically stored in EPROM and consists of a 4-byte vendor identification followed by a 4-byte node identification assigned by the manufacturer. The IDs for both switches and initiators are unsigned binary integers. The Unique_ID is used during the configuration process to detect cyclic networks.

In the configuration process each initiator 'walks' the network one link at a time. First the initiator chooses one of its operational ports and issues a Query_node message to the adjacent node. The adjacent node returns a Query_node_reply to indicate how many ports it has, which ports are operational and its Unique_ID, if any. The initiator enters this information into a configuration table together with the corresponding path address. (Typically the configuration table will also contain other information provided by the upper-level protocol, e.g. the device type and serial number from the SCSI Inquiry command.) The initiator then issues a Query_node to the next node via one of the operational ports on the adjacent node and so on until it has Walked the entire network.

If the network is cyclic then an initiator must detect when it has walked back to a node previously visited. This can be achieved by comparing the Unique_ID received from switch nodes and other initiators with previous entries in the configuration table.

If a node has a port which is not operational then an initiator does not attempt to walk that link during configuration. (This would produce an error.) If the port subsequently becomes operational each initiator will be alerted by an asynchronous message from the corresponding node. Then each initiator walks the new link and adds nodes to its configuration table until it encounters a single-port node, another port which is not operational or it returns to a Unique_ID that is already known.

Each initiator must perform the full configuration process when it powers on. It must also perform a partial configuration when it receives an asynchronous message as a result of a new link becoming operational.

If a link encounters a permanent error (e.g. the link has been disconnected) each initiator is alerted by an asynchronous message from the nearer of the 2 nodes connected by that link. Each initiator must then delete the path(s) to those nodes beyond the error from its configuration table.

A node that is just a target (e.g. a device) does not need to perform the configuration process or build a configuration table. It just responds to the Query_node messages from the initiators.

Two types of message are defined to support the configuration process, namely Query_node and Query_node_reply. A Query_node message is sent from an initiator to every other operational node during the configuration process. The destination node returns a Query_node_reply. This exchange also provides a remote wrap test to verify the integrity of the path.

On entry to the destination node the value remaining in the address field of the Query_node message should be 0000h for scheme 'A'. For scheme 'B', after taking account of the Digit_delete flag, the remaining address field should be 001h plus a possible pad digit. This guarantees that the message will be accepted regardless of whether the node is a single-port, dual-port or switch node. If an initiator intends to use several alternate paths to the same Target node then it must issue Query_node once over each path.

The Query_node message has two slightly different formats, "Format 1 and Format 2", which are shown in FIGS. 9A and 9B. Format 1 is perceived only in scheme A when a single-port or dual-port node receives a Query_node message. In all other cases format 2 is used. The components of the two formats are the Message_code, pad (format 1, only), tag, Return_address, and Unique_id.

Message_code identifies the message as 'Query_node'.

The pad byte arises because in scheme 'A' a single-port or dual-port node will interpret the last byte of the address field as the Message_code.

The tag is a 2-byte field returned in the Query_node_reply message. The tag is assigned by the initiator and must be unique among the tags that are currently active from that initiator.

Return_address is a 4-byte field specifying the value that should be placed in the address field of the resulting Query_node_reply message. It contains the whole address field, including the path and the channel, left-aligned and padded to 4 bytes. For scheme 'A' the channel is 0h and the padding is zero or more digits of Fh. For scheme 'B' the channel is 1h and the padding is zero or more digits of 0h. This allows the destination node to determine the significant digits.

Unique_ID is an 8-byte field containing the Unique_ID of the initiator that issued the Query_node message.

Figure 11:
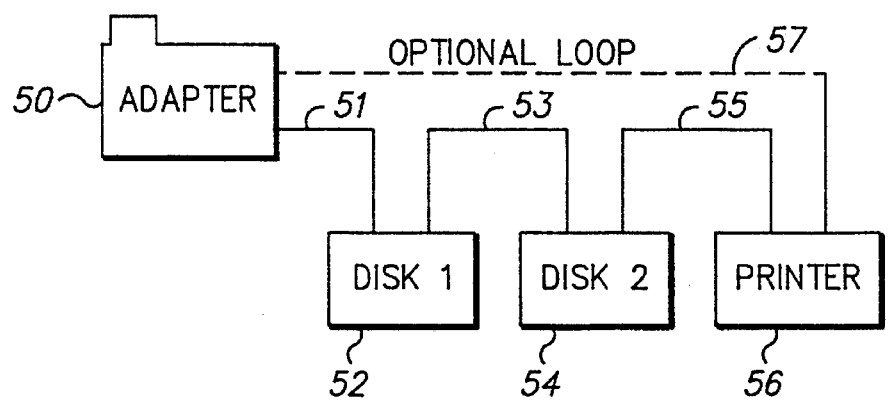
FIG. 11 shows a personal computer network in which the present invention can advantageously be employed.

The second type of message is the Query_node_reply which every node must return in response to a Query_node message. Query_node_reply is returned on the same port that received the corresponding Query_node message. It indicates the total number of ports implemented by the addressed node, which ports are operational and the port currently being used. A port is operational when it is receiving a signal from the remote node. The components of the Query_node_reply message are shown in FIG. 11.

Message_code is a byte identifying the message as 'Query_node_reply'. Current_port bits 7:4 contain an unsigned binary integer that indicates which port is currently being used. Total_ports bits 3:0 contains an unsigned binary integer that is one less than the number of ports implemented.

The tag is a 2-byte field copied from the Query_node message. It identifies the Query_node message for which this reply is being generated.

Port_mask is a 16-bit field indicating which ports are currently operational. The left-most bit is set if port 0 is operational and so on.

ULP is a byte identifying the upper-level protocol to communicate with the node. The only value currently defined is '00'X indicating 'SCSI-2'.

Init (bit 0), when set to 1b, indicates that: the node is an initiator.

Unique_ID is an 8-byte field present only if the node is an initiator or a switch.

The address field in a Query_node_reply frame is copied from the Return_address field in the corresponding Query_node message. However any complete padding bytes must be discarded.

The network addressing and configuration schemes described above may be used in a variety of different applications, two examples of which are now described. It will be appreciated that the present invention can readily be used in other types of network.

Personal Computer. A string of dual-ported devices is particularly attractive for connecting I/O devices to a personal computer, as shown in FIG. 11. Adapter 50 which will typically reside in the system unit of a personal computer is attached via link 51 to disk drive 52 which is in turn attached to disk drive 54 via link 53 which is in turn attached to printer 56 via link 55. The use of a string reduces the attachment cost per device and it avoids wiring congestion at the adapter. Using the method and apparatus of the present invention, the routing hardware in each of the two disk drives and printer is kept simple. Furthermore, there is no need for these devices to have addresses already assigned which with some devices avoids the need to manually assign addresses by means of a switch when the device is added to the string. Optionally the loop can be closed by provision of link 57 to provide increased bandwidth or a measure of fault-tolerance.

Figure 12:
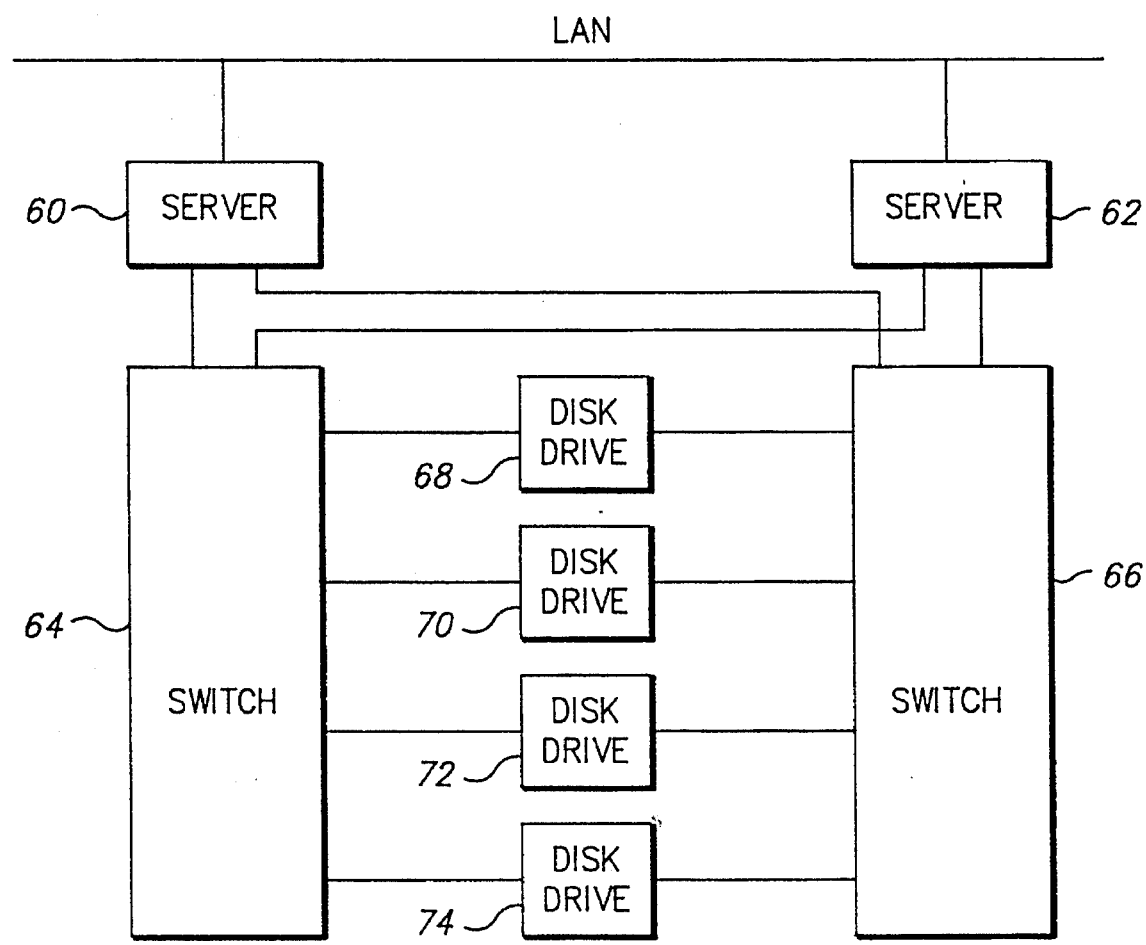
FIG. 12 shows an example of a file server network in which the present invention may be employed.

File server. High availability is important in a shared system such as a file server. This application also requires dual-ported disk drives, but this time the main reason for the second port is to provide a backup path in the event of a failure in the primary attachment path. Therefore in practice all serial disk drives will probably be dual-ported. In conjunction with disk arrays, dual-ported disk drives allow configurations with no single point of failure, as shown in FIG. 12. In this configuration a pair of servers 601 and 62 are connected via dedicated links to both switches 64 and each port of the dual-ported disk drives 68, 70 72 and 74 is connected to one of the switches. The use of dedicated links to each drive allow full concurrent maintenance with no impact to the operation of other drives.

We claim:

1. A method of configuring a network having a plurality of interconnected nodes, comprising the steps of:

defining an initiator node having at least one port connected to an adjacent node;

issuing a query message from said initiator node to each adjacent node connected to a port of said initiator node, said query message including a unique relative path address specifying a link between said initiator node and said adjacent node;

receiving said query message at said adjacent node and returning a reply message over said link, said reply message including said unique relative path address and a port number indicating a number of ports on said adjacent node connected to other nodes of said network;

receiving said reply message at said initiator node and entering said unique relative path address and said port number into a configuration table;

issuing a subsequent query message from said initiator node to each node connected to a port of said adjacent node, each subsequent query message including a subsequent relative path address specifying a unique path from said initiator node to each node connected to a port of said adjacent node;

receiving said subsequent query message and returning a subsequent reply message over said unique path, said subsequent reply message including said subsequent relative path address and a subsequent port number indicating a number of ports on said connected node connected to other nodes of said network;

receiving said subsequent reply message at said initiator node and entering said subsequent relative path address and said subsequent port number into said configuration table;

repeating the steps of sending a subsequent query message, returning a subsequent reply message, and entering a subsequent relative path address and a subsequent port number into said configuration table, for each connected port of each subsequently addressed connected node, until an entry has been made in said configuration table for each node of said network.

2. The method of claim 1, wherein said network of interconnected nodes includes at least one switch node, further comprising the steps of:

assigning a unique identifier to each switch node;

upon receiving a query message at a switch node from said initiator node, returning a switch reply message including said unique identifier, to said initiator node;

receiving said switch reply message including said unique identifier from said switch node at said initiator node and searching in said configuration table for said unique identifier, if said unique identifier is not found in said configuration table, entering said unique identifier into said configuration table and continuing the steps of sending, receiving and entering for each node connected to a port of said switch node, if said unique identifier is found in said configuration table, discontinuing said steps of sending, receiving and entering at a last-addressed port of said switch node, and continuing said steps at a next sequential port to be addressed in said network, if any.

3. The method of claim 1, further comprising the steps of:

defining a plurality of initiator nodes; and assigning a unique identifier to each of said plurality of initiator nodes.

4. A message routing apparatus for use in a switch node within a network, said switch node having more than two switch ports, said message routing apparatus comprising:

means for receiving a message from a source node, said message including a path address value specifying a path between said source node and a destination node through which said message is to travel;

means for determining whether a first and a second predetermined portion of said path address value correspond to a predetermined value, and if so accepting said message;

means for determining from said second predetermined portion of said path address value one of said switch ports through which said message is to be transferred if said second predetermined portion does not correspond to said predetermined value; and means for deleting said first and second predetermined portions of said path address value before transferring said message to an adjacent node along said path if said first predetermined portion does not correspond to said predetermined value.

5. A network of interconnected nodes including a plurality of dual-ported nodes connected to at least one predefined initiator node and a switch node, each of said; plurality of dual-ported nodes and said switch node including message routing apparatus, said message routing apparatus comprising:

means for receiving a message from said initiator node, said message including a path address value specifying a path between said initiator node and a destination node through which said message is to travel;

means for determining whether first and second predetermined portions of said path address value each correspond to a predetermined value, and if so accepting said message;

means for determining from said second predetermined portion of said path address value one of said switch ports through which said message is to be transferred if said second predetermined portion does not correspond to said predetermined value; and means for deleting said first and second predetermined portions of said path address value before transferring said message onto one of said interconnected nodes connected to said determined switch port if said first predetermined portion does not correspond to said predetermined value.

6. In a network having a plurality of interconnected network nodes including a combination of single-port nodes, dual port nodes, and switch nodes, a method of routing a message frame from a source node to a destination node, comprising the steps of:

issuing said message frame to said destination node, said message frame including a path address value specifying a path between said source node and said destination node;

receiving said message frame at a switch node along said path adjacent to said source node, and determining whether a first and a second predetermined portion of said path address value corresponds to a predetermined value of zero, if said first and said second predetermined portion of said path address corresponds to said predetermined value of zero, accepting said message frame at said switch node;

if said first predetermined portion of said path address corresponds to said predetermined value of zero and said second predetermined portion of said path address does not correspond to said predetermined value of zero, determining a port in said switch node from said second predetermined portion of said path address, deleting said first and said second predetermined portion of said path address, and routing said message frame to the next node along said path through said port;

if said first predetermined portion of said path address does not correspond to said predetermined value of zero, discarding said message frame; and, repeating the steps of receiving, determining, deleting, discarding, and routing at each subsequent node along said path until one of said subsequent nodes accepts said message frame.

7. The method of claim 6, wherein a plurality of channels are implemented in said destination node, and wherein a portion of said message frame forms a message address field including said path address value and a channel address specifying one of said plurality of channels to receive said message frame.

8. The method of claim 7, wherein said network includes a plurality of source nodes, and wherein at least one message frame and at least one data frame are simultaneously routed from at least one of said source nodes to one of said plurality of channels in said destination node.

9. The method of claim 8, further comprising the steps of:

predefining one of said plurality of channels to receive said at least one message frame; and dynamically assigning the remaining ones of said plurality of channels to receive said at least one data frame.

10. The method of claim 7, wherein said channel address is an n-bit value, $0 \leq n \leq 48$, thereby enabling substantially concurrent receipt of $2^n-1$ data and message frames at a corresponding destination node.

* * * * *